United States Patent
Muller et al.

(10) Patent No.: US 6,459,037 B2
(45) Date of Patent: Oct. 1, 2002

(54) LINE GUIDING ARRANGEMENT FOR SUPPORTING ENERGY LINES

(75) Inventors: Roland Muller, Siegen (DE); Wolfgang Richter, Kreuztal (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 09/788,860

(22) Filed: Feb. 20, 2001

Related U.S. Application Data

(63) Continuation of application No. PCT/EP99/05810, filed on Aug. 10, 1999.

(30) Foreign Application Priority Data

Aug. 17, 1998 (DE) .......................... 198 37 231

(51) Int. Cl.$^7$ .............................................. H02G 15/22
(52) U.S. Cl. ......................... 174/19; 174/68.1; 59/78.1
(58) Field of Search .................... 174/19, 68.1, 68.2, 174/68.3, 95, 97, 101; 248/51; 59/78.1, 83, 85

(56) References Cited

U.S. PATENT DOCUMENTS

| | | | | |
|---|---|---|---|---|
| 3,521,843 A | * | 7/1970 | Ogle ............................ | 174/95 |
| 4,392,344 A | | 7/1983 | Gordon et al. | |
| 4,585,281 A | * | 4/1986 | Van Camp ..................... | 248/51 |
| 5,127,515 A | * | 7/1992 | Damkjaer ..................... | 198/831 |
| 5,411,443 A | | 5/1995 | Meier et al. | |
| 5,638,672 A | * | 6/1997 | Furukawa ..................... | 59/78.1 |
| 6,065,278 A | * | 5/2000 | Weber et al. ................. | 59/78.1 |
| 6,161,373 A | * | 12/2000 | Heidrich et al. ............. | 59/78.1 |

FOREIGN PATENT DOCUMENTS

| | | |
|---|---|---|
| DD | 265449 B5 | 11/1996 |
| DE | G9016870.4 | 5/1992 |
| DE | 4428680 C1 | 9/1995 |
| EP | 0490022 A2 | 6/1992 |
| EP | 0544027 B1 | 6/1993 |

* cited by examiner

Primary Examiner—Chau N. Nguyen
(74) Attorney, Agent, or Firm—Alston & Bird LLP

(57) ABSTRACT

A line guiding arrangement for supporting at least one energy line, which is composed of a generally rectangular line receiving channel 1 that includes a base wall portion 2, a cover portion 3, and side wall portions 4, 5. The line receiving channel 1 is subdivided by transverse separations 6 into a plurality of segments 9, 10 that are tiltable relative to one another. The transverse separations 6 extend through the cover portion 3, and they continue in the side wall portions 4, 5 to at least the vicinity of the base wall portion 2. Also, the transverse separations are configured to define at least one recess 11 in one of the adjacent segments and a projection 12 in the other segment which engages within the recess 11. The flexural and torsional rigidity of the channel is thereby improved.

18 Claims, 8 Drawing Sheets

LINE GUIDING ARRANGEMENT FOR SUPPORTING ENERGY LINES

CROSS REFERENCE TO RELATED APPLICATION

The present application is a continuation of copending international application PCT/EP99/05810, filed Aug. 10, 1999, and designating the U.S.

BACKGROUND OF THE INVENTION

The subject matter of the invention relates to a line guiding arrangement for running at least one energy line.

Lines that lead from a stationary terminal to a movable consumer are laid in line guiding arrangements. The line guiding arrangement connects with its one end to a fixed point and with its other end to the movable consumer. Known are line guiding arrangements that are constructed from flexibly interconnected chain links, which define a receiving chamber. The receiving chambers of individual chain links form a channel, in which the lines are laid. Two opposite, spaced-apart chain sidebars as well as an upper and a lower crossbar define the receiving chamber. The crossbars are connected to the chain sidebars.

To run lines, DD 265 449 B5 discloses a line guiding arrangement that comprises a line receiving channel, which is defined by a support wall portion, a cover portion, and side wall portions. The line receiving channel is subdivided by transverse separations into a plurality of segments that are tiltable relative to one another. The transverse separations extend through the cover portion and continue in the side wall portions to at least the vicinity of the support wall portion.

EP 0 544 027 B1 discloses a further embodiment of a line guiding arrangement of the described type. Likewise, the line guiding arrangement proposed in EP 0 544 027 B1 serves to guide at least one line that runs in the line receiving channel. The line receiving channel comprises a support wall portion, a cover portion, and side wall portions. Transverse separations subdivide the line receiving channel into a plurality of segments that are tiltable relative to one another, so that the line guiding arrangement is bendable while forming a first half and a second half extending parallel thereto, as well as a looplike transition between the two halves. The transverse separations extend through the cover portion and continue in the side wall portions to at least the vicinity of the support wall portion. In the configuration of the line guiding arrangement according to EP 0 544 027 B1, of the cover portion and the side wall portions of the or each line receiving channel, at least one of these portions is shaped to project and made flexibly resilient relative to a channel wall portion that supports it toward the interior of the channel. The transverse separations extend substantially perpendicularly to the longitudinal direction of the line guiding arrangement.

Utility Model G 90 16 870.4 discloses a further configuration of a line guiding arrangement. The line guiding arrangement as disclosed in this document comprises a line guiding channel and an arrangement of several lines extending therein. The line guiding arrangement comprises a lower half and an upper half extending thereabove, which merge into each other in the form of a loop at one end of the guiding arrangement. A free end of the lower half connects to a stationary device, and a free end of the upper half to a device moving back and forth in the longitudinal direction of the line guiding arrangement. The lines are held together by a common bundling device, the outside of which mounts a sliding device with a good sliding ability that is effective in the longitudinal direction of the line. The sliding device prevents friction between the line arrangement portions of the upper half and the lower half even at a great line length.

Line guiding arrangements, as disclosed in DD 265 449 B5, EP 0 544 027 B1, or EP 0 490 022 A2, are made by extruding a profile of a plastic, and subsequently cutting same by means of a suitable tool, so that the channel is subdivided into individual segments.

Line guiding arrangements, as disclosed, for example, in EP 0 544 207 B1, are problematic in that the line guiding arrangement exhibits relatively little flexural and torsional stiffness, so that the practical usability of the line guiding arrangement is relatively limited. A further problem with the known line guiding arrangements is that they require additional elements, so-called radius clips, for forming a defined radius of curvature in the loop region. When these elements are connected to the line guiding arrangement, the upper half thereof will no longer be able to slide along the lower half of the line guiding arrangement. This also limits the uses of the line guiding arrangement, since it is not usable for longer distances.

Based on the foregoing, it is the object of the present invention to improve the known line guiding arrangement so as to increase the usability of the line guiding arrangement. In particular, the line guiding arrangement is to exhibit a greater flexural and torsional stiffness.

A further object of the invention is to provide a line guiding arrangement that facilitates forming a defined radius of curvature even without additional elements.

SUMMARY OF THE INVENTION

The above and other objects and advantages of the invention are achieved by the provision of a line guiding arrangement which comprises a line receiving channel of generally rectangular outline and which has a base wall portion, a cover portion, and opposite side wall portions. The line receiving channel is subdivided by transverse separations into a plurality of segments that are tiltable relative to one another. The transverse separations extend through the cover portion, and they continue into the side wall portions to at least the vicinity of the base wall portion. At least one transverse separation of two adjacent segments is designed and constructed such that the one segment comprises at least one recess and the other segment a projection which engages within the recess.

A further aspect of the invention relates to a line guiding arrangement which comprises two substantially parallel channels, which are interconnected by cross members. Each channel comprises a base wall portion, a cover portion, and at least one side wall portion. Each channel is subdivided by transverse separations into a plurality of segments that are tiltable relative to one another. The transverse separations extend through the cover portion, and they continue to at least the vicinity of the base wall portion. At least one transverse separation of two adjacent segments is designed such that the one segment comprises at least one recess and the other segment a projection engaging in the recess.

The line guiding arrangements designed and constructed in accordance with the invention are based on the concept that adjacent segments support each other in the longitudinal and/or transverse directions by a suitable configuration of the transverse separations, thereby realizing a higher flexural and torsional strength or transverse stiffness of the line guiding arrangements. If the projection of the one segment extends into the recess of the adjacent segment, a connection between the adjacent segments will be realized, which prevents the adjacent segments from displacing relative to each other. Preferably, the recess and the projection are formed such that adjacent segments remain engaged, even when they are tilted relative to each other in the loop region of the line guiding arrangement. This has the advantage that an increased flexural and torsional strength is realized even in the loop region of the line guiding arrangement.

The transverse separations may be formed by correspondingly guiding a cutting tool. It is also possible to cut transverse separations into the line guiding arrangement by means of a water jet cutting tool. It is further possible to cut transverse separations into the line guiding arrangement by means of appropriately shaped punch knives.

Preferably, the transverse separations have at least one section that intersects the longitudinal axis of the line guiding arrangement at an angle that is not a right angle. For example, the transverse separations may be arcuate, so as to describe the arc of a pitch circle. The arcuate transverse separations form in the one segment a recess, which has a curved front surface. The other segment includes a projection that has a correspondingly curved front surface. The transverse separations may also be zigzagged or meander-shaped.

According to an advantageous further development of the line guiding arrangements of the present invention, it is proposed to form the recess and the projection in the side wall portions. In particular, it is proposed to provide the recess and the projection with at least one arcuate section that extends in the longitudinal direction of the line guiding arrangement. This configuration of the recess and the projection provides in addition a guidance of adjacent segments during a tilting operation. Such a tilting operation occurs during the movement of the line guiding arrangement, when a line section merges into the loop-shaped region of the line guiding arrangement.

According to a further, advantageous configuration of the line guiding arrangement in accordance with the invention, it is proposed to form the recess and projection in cover wall portions. The formation of projections and recesses in the cover wall portions entail an increased flexural and torsional strength of the line guiding arrangement.

According to a still further, advantageous configuration of the line guiding arrangement, it is proposed to form the base wall portion between the cover portion and a bottom portion. Additional transverse separations are provided, which extend through the bottom portion and continue in at least one side wall portion to at least the vicinity of the base wall portion. The additional transverse separation of two adjacent segments is formed such that the one segment includes at least one recess and the other segment at least one projection engaging the recess. The recess resulting from this additional measure that is taken in a line guiding arrangement, permits a still higher flexural and torsional stiffness of the line guiding arrangement to be achieved. A further advantage of the configuration is provided in the case of transverse separations in the side wall portions below the base wall portion of inverted V-shaped configuration, by which limiters of the arc of curvature are formed, so that additional elements can be omitted. Since the limiters of the arc of curvature form an integral part of the line guiding channel or of each channel, it is possible to run an upper half of the line guiding arrangement on a lower half thereof. Therefore, the line guiding arrangement is also able to overcome greater displacements.

According to a still further, advantageous configuration, it is proposed to make the recess and projection such that they complement each other. This simplifies production of the line guiding arrangement.

The limitation of the angle of tilt and thus likewise of the arc of curvature of the line guiding arrangement in the region of the loop formation may also occur in that the recess and the projection have each at least one stop surface that limits an angle of arc of adjacent segments.

According to a still further, advantageous embodiment of the line guiding arrangement, it is proposed to form the projection so that it is composed of a tab having a head that laterally extends beyond the tab cross section. The recess comprises a section, in which the tab is movable and a receptacle for the head, in which the head is movable. The longitudinal extent of the head receptacle is greater than the longitudinal extent of the head. This can be realized by corresponding punchings or cutouts. This configuration of the line guiding arrangement accomplishes with simple means a limitation of the angle of tilt of adjacent segments. In particular, the longitudinal extent of the recess is greater than the longitudinal extent of the projection. Preferably, the recess and the projection are made substantially T-shaped.

BRIEF DESCRIPTION OF THE DRAWINGS

Further details and advantages of the line guiding arrangement according to the invention are described in more detail with reference to several embodiments illustrated in the drawings, in which.

Detailed Description of the Preferred Embodiments

Figure 1:
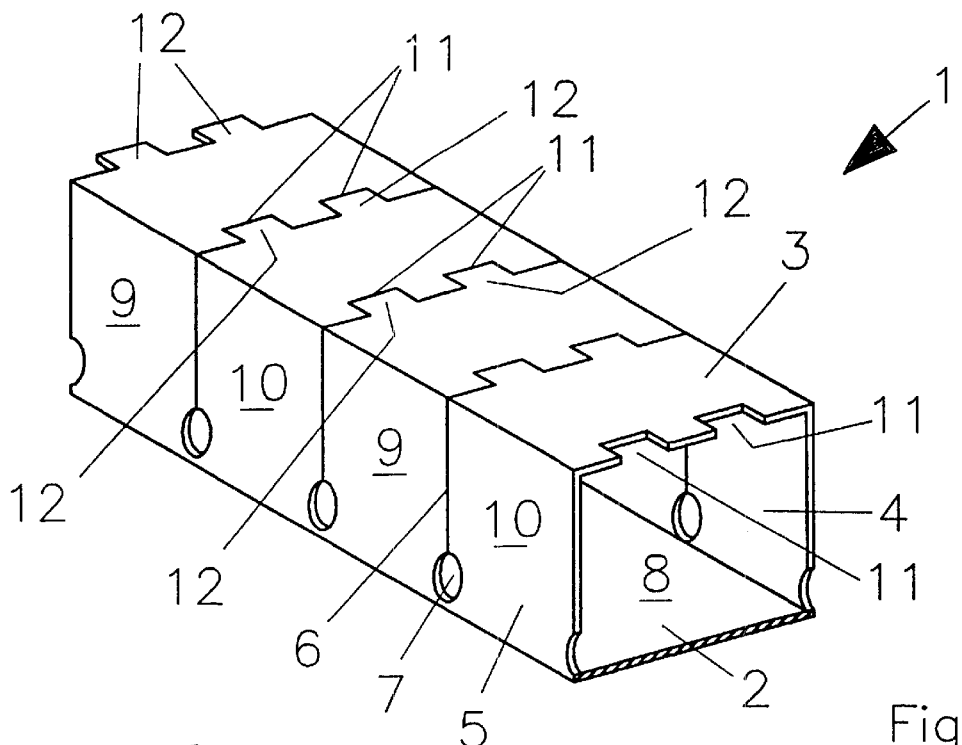
FIG. 1 is a perspective view of a first embodiment of a line guiding arrangement which embodies the present invention.

FIG. 1 illustrates a longitudinally extending line guiding arrangement for running at least one energy line. The one energy line, which is not shown in FIG. 1, runs in a channel 8 of a line receiving channel 1, which comprises a base wall portion 2, a cover portion 3, and side wall portions 4, 5. The cross section of the line receiving channel 1 is substantially rectangular, but other cross sections are possible.

Transverse separations 6 subdivide the line receiving channel 1 into a plurality of segments 9, 10 that are tiltable relative to one another. The transverse separations 6 extend through the cover portion 3, and they continue in side wall portions 4, 5 to at least the vicinity of the base wall portion 2. In the illustrated embodiment, the transverse separations 6 terminate in openings 7, which have a substantially circular cross section. The circular openings 7 are intended to reduce material stress of the line receiving channel 1 in the tilted state of adjacent segments 9, 10.

The transverse separations 6 of two adjacent segments 9, 10 are made such that the one segment 9 has at least one recess 11, and the other segment 10 has at least one projection 12 engaging the recess 11. In the illustrated embodiment, the segments 9, 10 comprise both recesses 11 and projections 12. For example, if one looks at segment 9, it comprises recesses 11 toward segment 10 that adjoins segment 9 to the right, into which projections 12 of adjacent segment 10 to the right of segment 9 extend. In the edge region opposite to recesses 11, the segment 9 comprises projections 12, which engage correspondingly shaped recesses 11 of segment 10 arranged to the left of segment 9. This configuration of the line guiding arrangement has the advantage that the guidance of a cutting tool, which may be, for example, a laser, is always the same. To the extent that it is useful, the transverse separations may also be selected such that the one segment has only recesses or only projections and the adjacent segment only projections or recesses. Which segments have recesses and/or projections depends on the extension of the transverse separations.

The fact that the transverse separations extend such that the adjacent segments 9, 10 includes interlocking projections 12 and recesses 11 achieves an increased torsional stiffness of the line receiving channel 1 and thus likewise of the line guiding arrangement, since the adjacent segments are not displaceable relative to each other crosswise to the longitudinal direction of the line guiding arrangement.

As shown in FIG. 1, in the extended state of the line guiding arrangement, the projections 12 engage the recesses 11.

Figure 3:
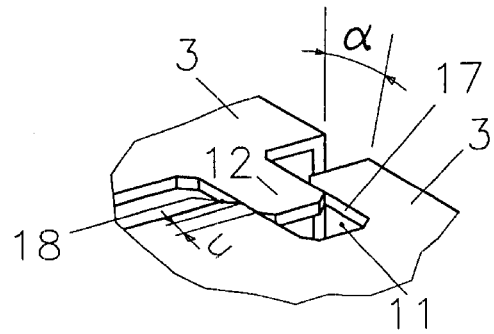
FIG. 3 is a schematic cutout view of adjacent segments in a tilted state.

When the line guiding arrangement is caused to bend into a loop shape, the segments 9, 10 tilt relative to one another about an axis extending in the base wall portion crosswise to the longitudinal direction of the line guiding arrangement. FIG. 3 is a cutout view of two adjacent segments 9, 10 in a tilted state. Indicated at α is the angle of tilt of adjacent segments. During the tilting, the projection 12 moves out of recess 11. In the illustrated embodiment the projection 12 has the shape of a rectangular tab. The recess 11 is complementary to the projection 12. The parallel extending surfaces 17, 18 of respectively the recess or projection slide past each other. Indicated at U is a projecting length of projection 12, which extends into recess 11, when the adjacent segments reach the maximally permissible angle of tilt α. This configuration of the recess 11 and projection 12 has the advantage that even in the tilted state of the segments, the line receiving channel exhibits a greater torsional stiffness. Therefore, it is preferred to select the length of the projection or recess in the longitudinal direction of the line guiding arrangement such that the projection 12 extends in part into the recess 11 even in the tilted state of adjacent segments. This advantage is realized not only with the configuration of recess 11 and projection 12 in the cover portion, but also in the side wall portions.

Figure 2:
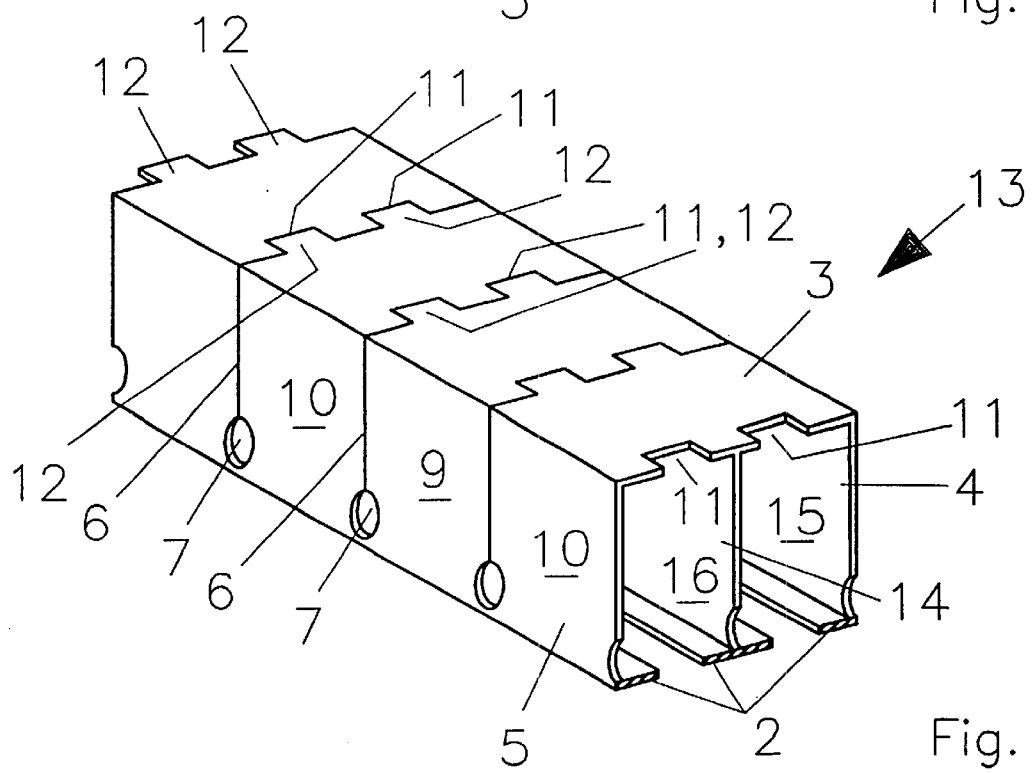
FIG. 2 is a perspective view of a second embodiment of a line guiding arrangement.

FIG. 2 illustrates a further embodiment of a line receiving channel 13. The basic construction of line receiving channel 13 corresponds to that of line receiving channel 1. Like parts of line receiving channel 13 and line receiving channel 1 are provided with like numerals.

The line receiving channel 13 is subdivided by a partition 14 to form a channel section 15 and a channel section 16. The partition 14 extends substantially parallel to side walls 4, 5. The transverse separations 6 also extend through partition 14.

Figure 4:
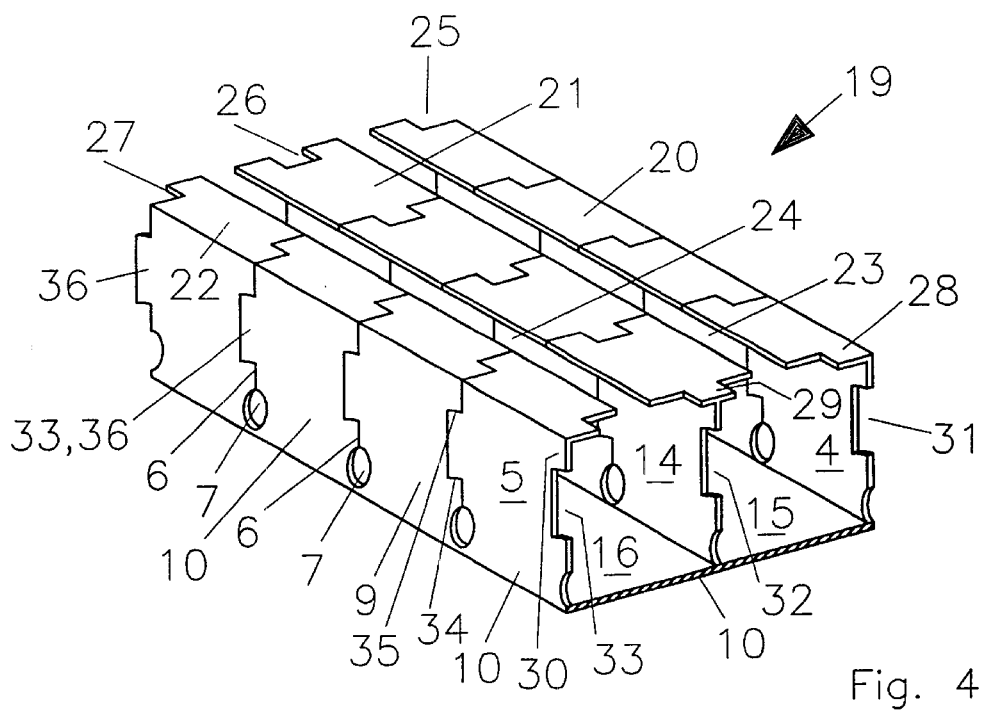
FIG. 4 is a perspective view of a line guiding arrangement with recesses and projections in the side wall portions.

FIG. 4 is a schematic view of a further embodiment of a line receiving channel 19. The line receiving channel 19 comprises side wall portions 4, 5. Between the side wall portions 4, 5, a partition 14 is provided, which extends substantially in the longitudinal direction of the line receiving channel 19 and parallel to the side walls 4, 5. The line receiving channel 19 comprises cover portions 20, 21, and 22. Between adjacent cover portions 20, 21; 21, 22, gaps 23, 24 are provided, through which a line can be inserted into channel 15 and 16 respectively.

The line receiving channel 19 is subdivided by transverse separations 6 into a plurality of segments 9, 10 that can be tilted relative to one another. The transverse separations 6 extend through cover portions 20, 21, 22. They continue in side wall portions 4, 5 and partition 14 to at least the vicinity of base wall portion 2.

The transverse separations 6 are configured such that adjacent segments 9, 10 have recesses and projections that engage each other. In the cover portion 20 of a segment 9, a recess 25 and a projection 28 are formed. In the cover region 21 of a segment 10, a recess 26 and a projection 29 are formed. In the cover region 22, a recess 27 and a projection 30 are formed. The recesses 25, 26, 27 and the projections 28, 29, 30 are shaped such that they engage in the extended state of line receiving channel 19. The basic mode of operation of projections 28, 29, 30 and the recesses 25, 26, 27 corresponds substantially to the mode of operation of a line guiding arrangement as has been described with reference to FIG. 3.

In addition to the recesses and projections in the cover portion, the line receiving channel 19 comprises recesses 31, 32, 33 in the side wall portions 4, 5 and in the partition 14. The side wall portions 4, 5 and partition 14 comprise correspondingly shaped projections 36. The recesses 31, 32, 33 comprise two, substantially parallel extending sections 34, 35 that are made arcuate. The projections 36 have corresponding sections.

During the tilting of the line receiving channel, adjacent segments are guided by the interengaging projections 36 and recesses 31, 32, 33. The recesses 31, 32, 33 and projections 36 also contribute to the torsional strength of the line receiving channel 19.

Figure 5:
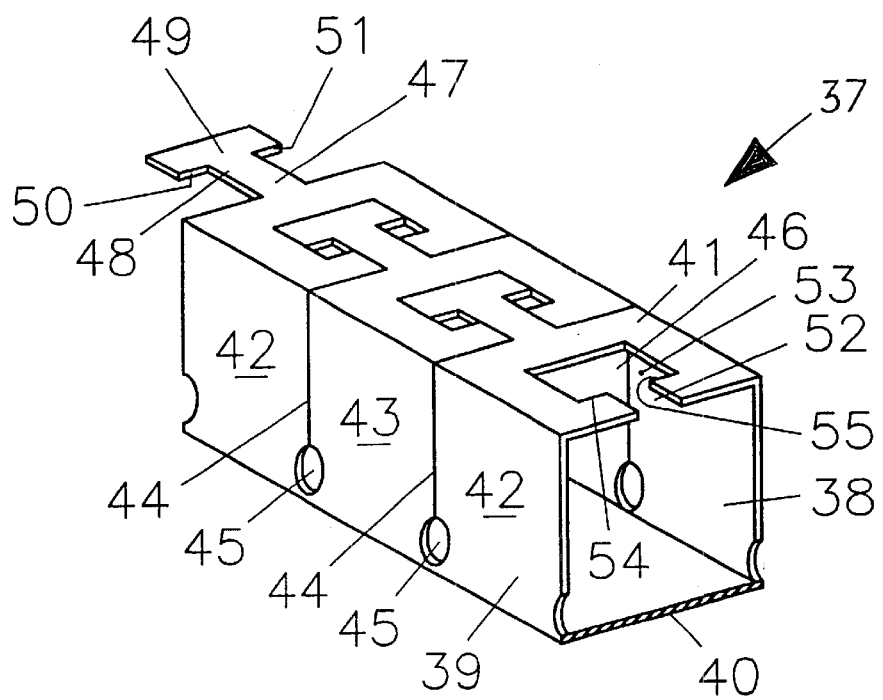
FIG. 5 shows a line receiving channel or a channel for a line guiding arrangement which has a limitation of the angle of traverse.

FIG. 5 illustrates the configuration of a further embodiment of a channel 37 for a line guiding arrangement for running at least one line. The channel 37 comprises a base wall portion 40, a cover portion 41, and side wall portions 38, 39. The channel 37 is made as a hollow, rectangular section.

The channel 37 is subdivided by transverse separations 44 into a plurality of segments 42, 43 that are tiltable relative to one another. The transverse separations extend through the cover portion 41, and they continue in the side wall portions 38, 39 to at least the vicinity of the base wall portion 40. The transverse separations 44 terminate in openings 45, which permit reducing the stress of the channel in the region of the bending axes.

The transverse separation of two adjacent segments is formed such that the one segment has a T-shaped recess 46 and the other segment a T-shaped projection 47 extending into the recess 46.

The projection 47 comprises a tab 48 extending in the longitudinal direction of channel 37. The free end of tab 48 is provided with a rectangular head 49 that laterally extends beyond the tab cross section.

The recess 46 comprises a section 52 for the movement of tab 48. The recess 46 comprises a rectangular head receptacle 53 for the movement of head 49 of projection 47. As best seen in FIG. 5, the longitudinal extent of head receptacle 53 is greater than the longitudinal extent of head 49, so that the projection 47 and recess 46 permit tilting of adjacent segments.

Figure 6:
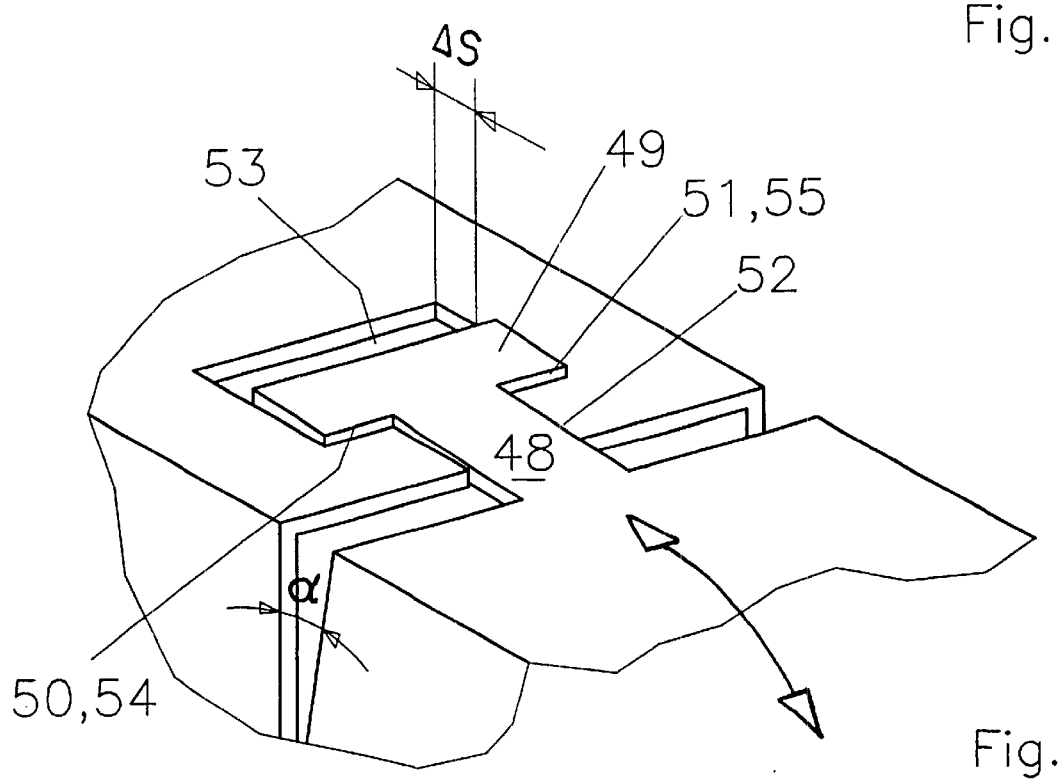
FIG. 6 is an enlarged view of adjacent segments of the line guiding channel or channel of FIG. 5 in a tilted state.

FIG. 6 shows two adjacent segments of the channel 37 in a tilted state. Indicated at ΔS is the distance, by which the head 49 is displaced inside the head receptacle 53 substantially in the longitudinal direction of channel 37. The angle of tilt α is proportionate to the distance ΔS. A corresponding adaptation of the distance ΔS permits adjustment of an angle of tilt α.

The head 49 comprises stop surfaces 50, 51 that contact stop surfaces 54, 55 of head receptacle 53. The stop surfaces 51, 55; 50, 54 also limit the angle of tilt α.

A line guiding arrangement may be constructed by using two channels 37. The channels 37 are joined to each other in spaced relationship by suitable connecting members. In the space between the parallel extending channels, it is possible to arrange lines.

In the illustrated embodiment of FIG. 5, the channel 37 is a hollow section. The basic construction of the channel 37 may also be used to the end that it serves as a line receiving channel. In such an instance, a line can be inserted directly into the line receiving channel.

Figure 7:
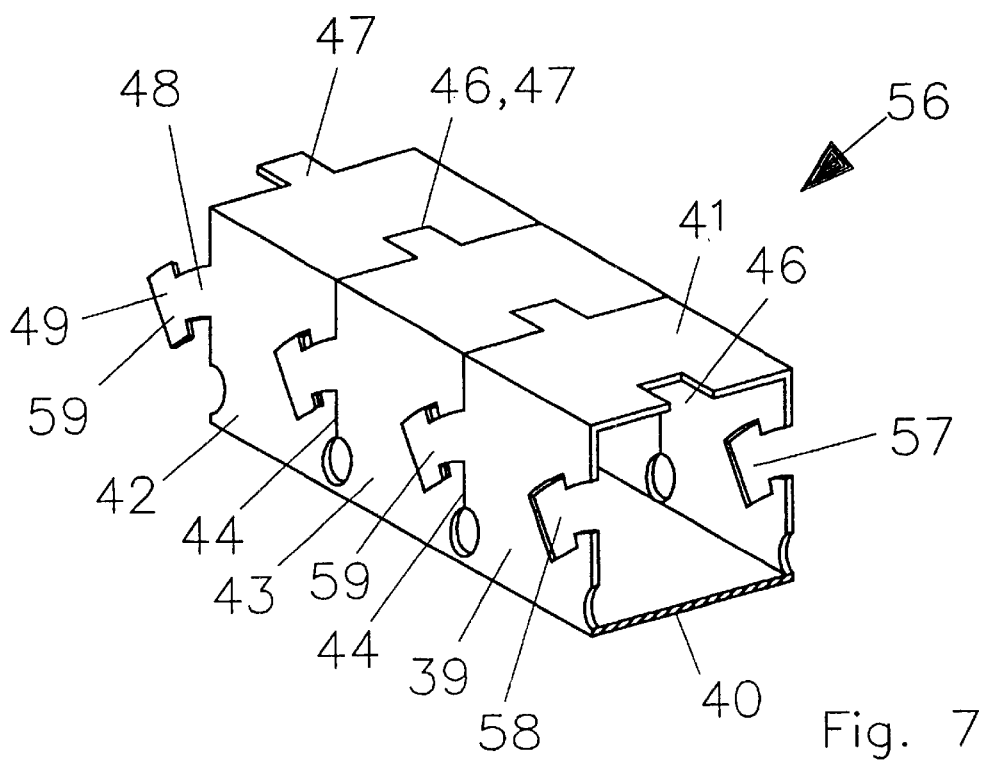
FIG. 7 is a schematic view of a further embodiment of a line guiding arrangement or channel with limiters of the angle of traverse.

FIG. 7 illustrates a further embodiment of a channel 56 for a line guiding arrangement for running at least one line. The channel 56 is made as a hollow profile. It comprises a base wall portion 40, a cover portion 41, and side wall portions 38, 39. The channel 56 is subdivided by transverse separations 44 into a plurality of segments 42, 43 that can be tilted relative to one another. The transverse separations extend through the cover portion 41. They continue in the side wall portions 38, 39 to at least the vicinity of the base wall portion 40. In the embodiment of channel 56 as illustrated in FIG. 7, recesses 46 and projections 47 are formed in the cover portion 41. In addition, recesses 57, 58 are formed in the side wall portions 38, 39, into which projections 59 extend.

The projections 47 are made substantially in the shape of tabs. They extend into substantially rectangular recesses 46.

Figure 8:
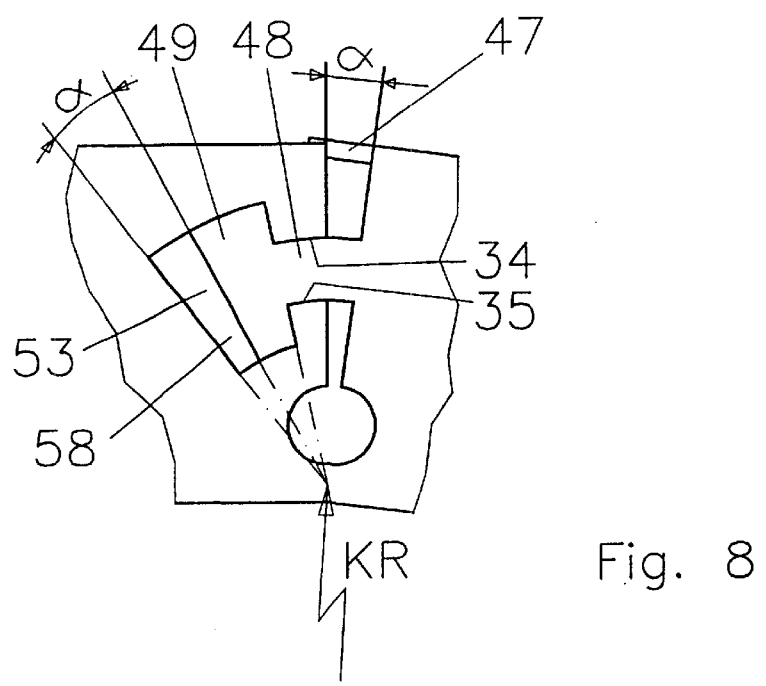
FIG. 8 shows two adjacent segments of the line guiding arrangement of FIG. 7 in a tilted state.

The recesses 57, 58 formed in the side wall portions 38, 39 each have a head receptacle 53. The head receptacle connects to a relatively narrow slot as seen in FIG. 8. Both the head receptacle 53 and the slot comprise arcuate side walls 34, 35, which are centered at the axis of tilt KR.

The projection 59 comprises an arcuate tab 48 that extends into the slot 52 of recess 57 and 58 respectively. The projection 59 has a head 49 at the free end of tab 48.

As best seen in FIG. 8, the length of the receptacle 53 is greater, when viewed in the tilting direction of adjacent segments 42, 43 of the channel 56, than the head 49, so that it is possible to tilt adjacent segments 42, 43 by an angle of tilt α. The head 49 and the receptacle 53 are shaped such that they cause a limit of the angle of tilt α.

During the tilting, the projection 47 slides out of the recess 46. Preferably, the projection 47 is dimensioned in the longitudinal direction of channel 56 such that it continues to extend within recess 46 even upon reaching a maximum angle of tilt α. A relative displacement of the segments 42, 43 crosswise to the longitudinal direction of channel 56 is prevented in particular by projection 47 and recess 46.

As previously described, the channel 56 illustrated in FIG. 7 is made as a hollow section. It is also possible to use the channel 56 directly as a line receiving channel, in which lines may be run in a protected arrangement.

Figure 9:
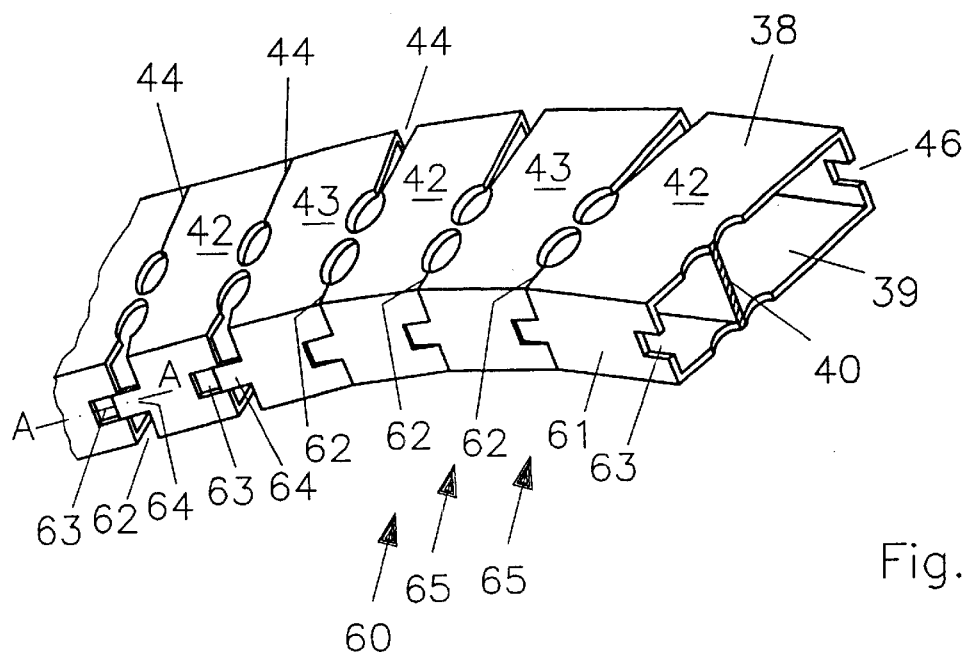
FIG. 9 is a schematic and perspective view of a line guiding arrangement or a channel with limiters of the radius of curvature.

FIG. 9 is a schematic and perspective view of a channel 60. The channel 60 comprises a base wall portion 40, a cover portion 41, as well as side wall portions 38, 39. Transverse separations 44 subdivide the channel 60 into a plurality of segments 42, 43 that are tiltable relative to one another. The transverse separations extend through the cover portion 41, and they continue in the side wall portions 38, 39 to the vicinity of the base wall portion 40. The transverse separations 44 are formed such that the segments 42 each comprise a recess 46 and a projection 47. The projection 47 of a segment 42 extends into a recess 46 of an adjacent segment 43. The configuration of recess 46 and projection 47 corresponds substantially to the configuration of a projection and a recess as shown in FIG. 3. In this embodiment, it is not necessary that the projection 47 extend in part into recess 46 in the tilted state of the channel 60.

The base wall portion 40 is formed between the cover portion 41 and a bottom portion 61. The channel 60 comprises additional transverse separations 62 that extend through the bottom portion 61. They continue in the side wall portions 38, 39 to the vicinity of base wall portion 40. The additional transverse separations 62 are of inverted V-shape, so that the additional transverse separations 62 permit the tilting of adjacent segments 42, 43. The angle of tilt is dependent on the opening angle of the additional separations 62. In the bottom portion 61, the additional separations form recesses 63 and projections 64.

As best seen in FIG. 9, each segment 42, 43 comprises each a recess 63 and a projection 64. The longitudinal extension of recesses 63 and the longitudinal extension of projections 64 are selected such that they permit tilting of adjacent segments 42, 43. As shown in FIG. 9, the projections 64 are disengaged from recesses 63 in the extended state of channel 60. During the tilting of adjacent segments 42, 43, the projection 64 of a segment enters the recess 63 of an adjacent segment, as shown in FIG. 9.

The configuration of recess 46 and projection 47 in cover portion 41, as well as the configuration of recess 63 and projection 64 are preferably selected such that either the projection of the cover portion and/or the projection of the bottom portion always engage the corresponding recess, so that adjacent segments are prevented from moving substantially crosswise to the longitudinal direction of the channel.

The channel 60 shown in FIG. 9 may also be used directly as a line receiving channel.

The sections of the side wall portions 38, 39, as well as the bottom portion 61 form each a limiter 65 of the arc of curvature.

Figure 11:
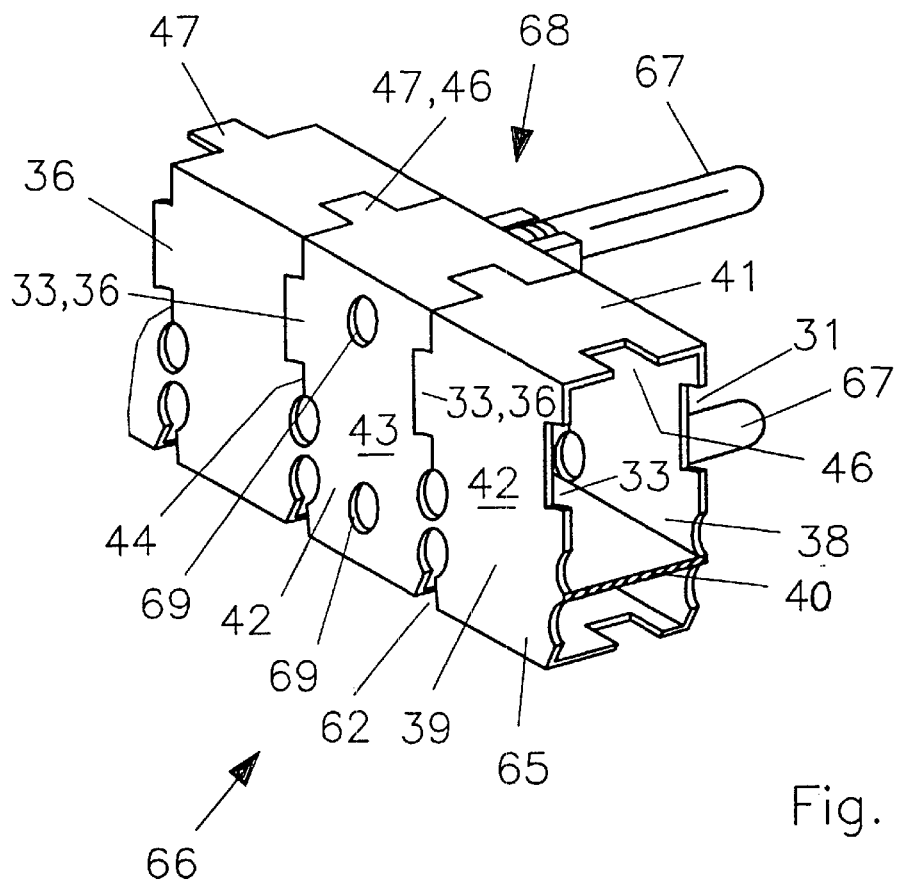
FIG. 11 is a schematic view of a line guiding arrangement with one channel.

FIG. 11 illustrates a further embodiment of a line guiding arrangement for running at least one line. FIG. 11 shows a channel 66 that connects by means of crossbars to a second channel which extends parallel to the channel 66. The second channel, which is not shown, preferably corresponds to channel 66. A side wall portion 38 of a segment 42 mounts a connecting member 68, which joins the crossbars 67 to the channel 66. In the side wall portion 39, holes 69 are formed, through which fastening elements can extend for attaching the connecting members 68.

The channel 66 comprises a base wall portion 40, a cover portion 41, and side wall portions 38, 39. Transverse separations 44 subdivide the channel 66 into a plurality of segments 42, 43. The segments 42, 43 are tiltable relative to one another. The transverse separations 44 extend through the cover portion 41, and they continue in the side wall portions 38, 39 to the vicinity of the base wall portion 40. In the cover portion 41, projections 47 and recesses 46 are formed. The recesses 46 and the projections 47 are made complementary to each other. Each segment 42, 43 comprises a projection 47 and a recess 46. A projection 47 of a segment 42 extends into the recess of a segment 43.

Recesses 33 and projections 36 are likewise formed in the side wall portions 38, 39. The recesses 33 and the projections 36 are made complementary to each other, and they comprise arcuate sections.

Figure 10:
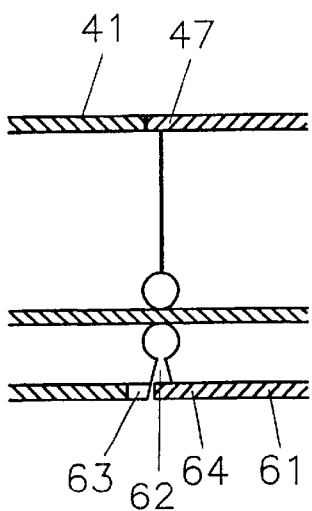
FIG. 10 is a sectional view along line A—A of FIG. 9.

Below the base wall portion 40, limiters 65 of the arc of curvature are formed. The configuration of the limiters 65 of the arc of curvature corresponds to that shown in FIGS. 9 and 10.

Figure 12:
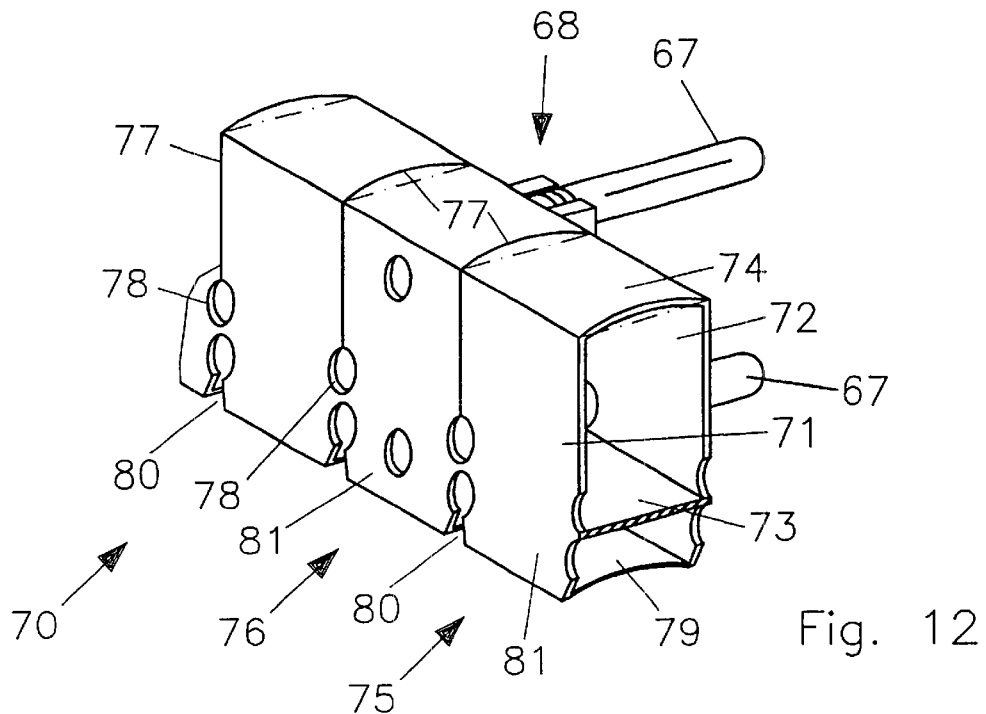
FIG. 12 is a schematic and perspective view of a channel with curved transverse separations.
Figure 13:
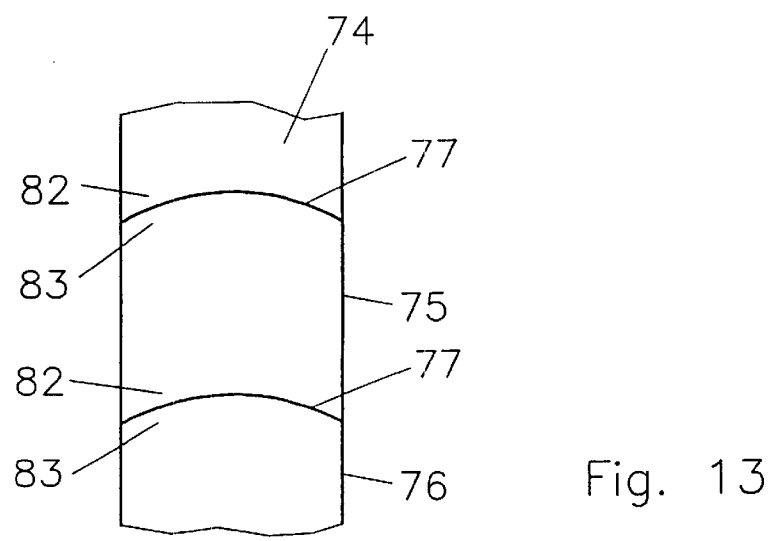
FIG. 13 is a top view of the channel of FIG. 12.

FIGS. 12, 13 show another embodiment of a channel 70 for a line guiding arrangement for running at least one line. The channel 70 comprises a base wall portion 73, a cover portion 74, and side wall portions 71, 72. Transverse separations 77 subdivide the channel 70 into a plurality of segments 75, 76. The segments 75, 76 are tiltable in the longitudinal direction of channel 70. The transverse separations 77 extend through the cover portion 74, and they continue in the side wall portions 71, 72 to the vicinity of the base wall portion 73. The transverse separations 77 end in openings 78, which prevent bending stress of the channel in the region of the bending axes extending crosswise to the longitudinal axis of the channel.

The side wall portions 71, 72 continue below the base wall portion 73. Substantially parallel to the base wall portion 73, a bottom portion 79 is provided, which connects to extensions of the side wall portions 71, 72 that continue below the base wall portion 73.

The channel 70 comprises additional transverse separations 80 that extend through the bottom portion 79. These additional transverse separations 80 continue in the side wall portions 71, 72 to the vicinity of the support wall portion 73. As shown in FIG. 12, the additional transverse separations 80 are substantially V-shaped. The additional transverse separations 80 are substantially in alignment with the transverse separations 77. The sections of side wall portions 71, 72 that extend below the support wall portion 73, as well as the bottom portion 79 of each segment 75, 76 form each a limiter 81 of the arc of curvature.

As shown in FIGS. 12 and 13, the transverse separations 77 are made substantially arcuate. The transverse separations 77 form in segment 75 a recess 82, into which a correspondingly shaped projection of segment 76 extends.

It is not necessary that the transverse separation be made arcuate over the entire width of channel 70. The transverse separation may also be Ω-shaped.

Figure 14:
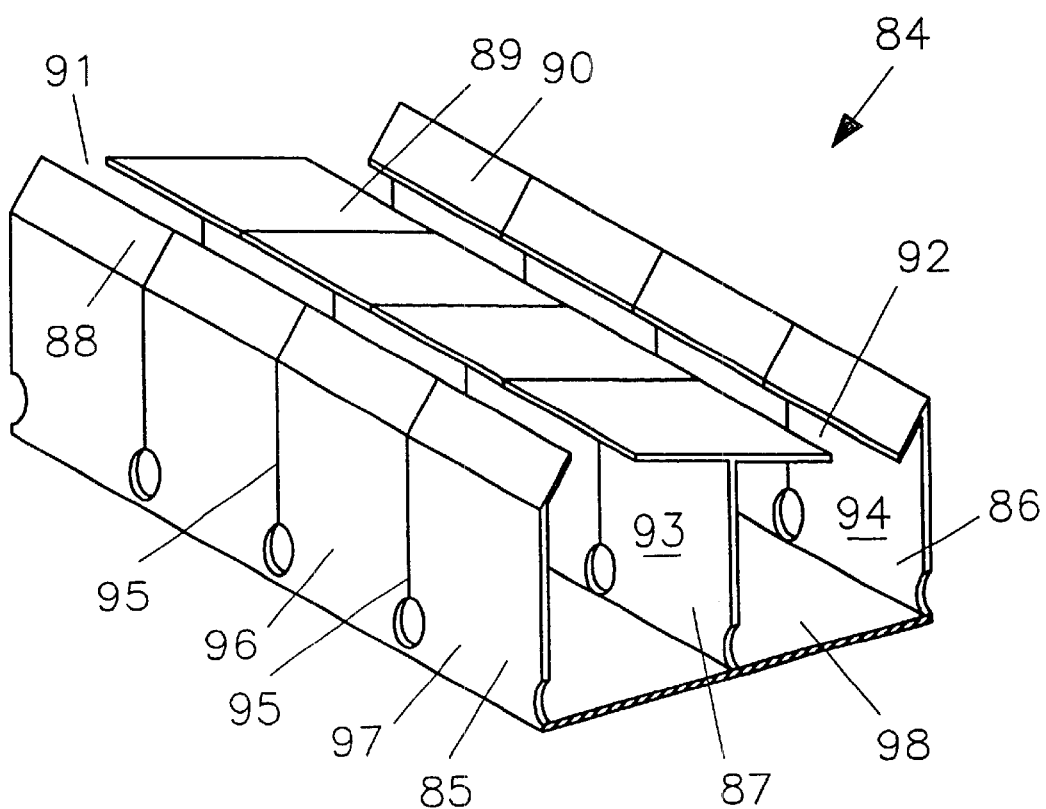
FIG. 14 is a perspective view of a further embodiment of a line guiding arrangement with zigzagged transverse separations.
Figure 15:
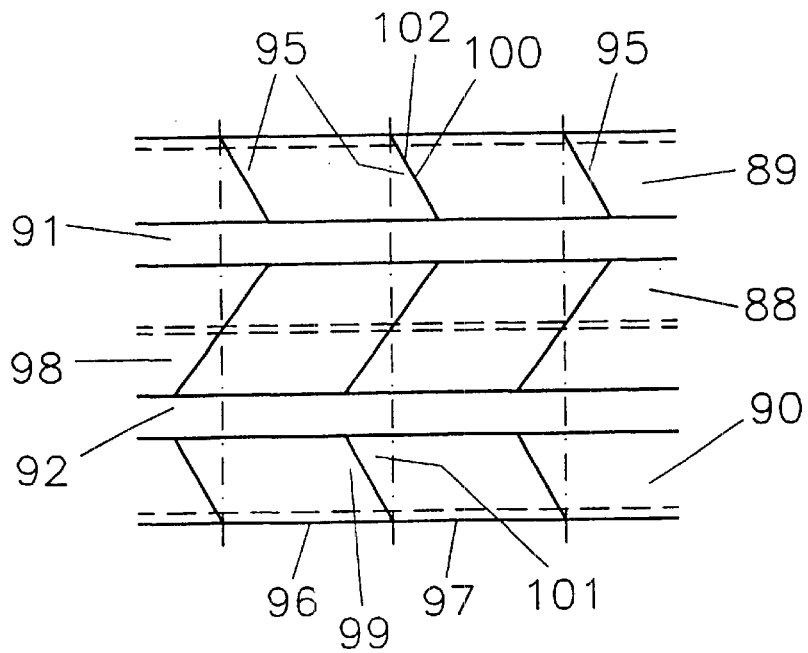
FIG. 15 is a top view of a line guiding arrangement.

FIGS. 14 and 15 illustrate a further embodiment of a line guiding arrangement. The basic construction of the line guiding arrangement corresponds to the construction of a line guiding arrangement as shown in FIG. 4. The line guiding arrangement comprises a line receiving channel 84, which comprises side wall portions 85, 86. Between the side wall portions 85, 86, a partition 87 is provided, which extends substantially in the longitudinal direction of the line receiving channel 84 and parallel to the side wall portions 85, 86. The line receiving channel 84 comprises cover portions 88, 89, and 90. Between adjacent cover portions 88, 89; 89, 90, gaps 91, 92 extend, through which a line can be inserted into a channel 93 defined by side wall portion 85 and partition 87 or into a channel 94 that is defined by partition 87 and side wall portion 86.

The line receiving channel 84 is subdivided by transverse separations 95 into a plurality of segments 96, 97 that are tiltable relative to one another. In particular, the transverse separations are made equidistant to each other in the longitudinal direction of the line receiving channel, so that all segments 96, 97 have the same extension in the longitudinal direction of the line receiving channel 84.

The transverse separations 95 extend through the cover portions 88, 89, 90. They continue in the side wall portions 85, 86 and partition 87 to at least the vicinity of a base wall portion 98.

As best seen in FIG. 15, the transverse separations 95, are made zigzagged, when viewed crosswise to the longitudinal direction of line receiving channel 84. The transverse separation 95 formed between two adjacent segments 96, 97 forms in segment 96 a recess 99 and in segment 97 a recess 100. A corresponding projection 101 or 102 is formed in the segment adjacent to the recess.

What is claimed is:

1. A line guiding arrangement for supporting at least one energy conducting line, comprising a longitudinally extending one piece line receiving channel which comprises a base wall portion, a cover portion, and opposite side wall portions which extend between the base wall portion and cover portion, a plurality of longitudinally spaced transverse separations which subdivide the line receiving channel into a separations which of segments, with the transverse separations extending through the cover portion and continuing into the side wall portions to at least the vicinity of the base wall portion and without severing the bottom wall so that the segments are tiltable relative to one another, and wherein each transverse separation between each adjacent pair of said segments is configured to define at least one recess in one of said adjacent segments and at least one projection in the other of said adjacent segments that engages within the recess.

2. The line guiding arrangement of claim 1 wherein the at least one recess and the at least one projection are formed in at least one of the side wall portions of the adjacent segments.

3. The line guiding arrangement of claim 2 wherein the adjacent segments are tiltable relative to each other to define an axis of tilt which is transverse to the longitudinal direction, and wherein the at least one recess and the at least one projection are arcuately curved about said axis.

4. The line guiding arrangement of claim 1 wherein the at least one recess and the at least one projection are formed in the cover portion.

5. The line guiding arrangement of claim 1 wherein the line receiving channel defines a maximum permissible angle of tilt, and wherein the longitudinal length of the at least one recess and the longitudinal length of the at least one projection are selected such that a portion of the length of the projection extends into the recess even when the maximum permissible angle of tilt is reached.

6. The line guiding arrangement of claim 1 wherein the channel further comprises a bottom portion positioned on the side of the base wall portion opposite the cover portion, and additional transverse separations which extend through the bottom portion and continue in the opposite side wall portions to at least the vicinity of the base wall portion.

7. The line guiding arrangement of claim 6 wherein the additional transverse separations have an inverted V-shaped outline in cross section and are aligned with respective ones of the transverse separations.

8. The line guiding arrangement of claim 6 wherein the additional transverse separations between said adjacent segments are configured to define at least one recess in one of said adjacent segments and at least one projection in the other of said adjacent segments that engages within the recess.

9. The line guiding arrangement of claim 1 wherein the at least one recess and the at least one projection are complementary in configuration.

10. The line guiding arrangement of claim 1 wherein the at least one recess and the at least one projection have mating stop surfaces which limit the angle of tilt of said adjacent segments.

11. The line guiding arrangement of claim 10 wherein the at least one recess and the at least one projection have complementary T-shaped configurations so that the head of the projection is locked for limited longitudinal movement within the head receptacle of the recess.

12. The line guiding arrangement of claim 1 wherein the at least one recess comprises a head receptacle and a relatively narrow slot, and the at least one projection comprises a head received in the head receptacle and a tab extending through the slot, and wherein the head receptacle has a longer longitudinal extent than does the head.

13. The line guiding arrangement of claim 1 wherein the line receiving channel further comprises at least one partition extending between the cover portion and the base wall portion so as to divide the channel into a plurality of channel sections, and wherein the transverse separations extend from the cover portion and into said at least one partition to at least the vicinity of the base wall portion.

14. The line guiding arrangement of claim 13 wherein the cover portion comprises a cover portion segment attached to respective ones of the opposite side wall portions and the partition, with the adjacent cover portion segments being separated so as to define a gap through which a line can be inserted into the associated channel.

15. The line guiding arrangement of claim 14 wherein the traverse separations have a zigzagged outline across said cover portion which defines said at least one recess and said at least one projection.

16. The line guiding arrangement of claim 1 wherein the line receiving channel is of generally rectangular outline.

17. The line guiding arrangement of claim 1 wherein the cover portion includes a longitudinally extending gap through which a line can be inserted into the channel.

18. A line guiding arrangement for guiding at least one energy conducting line comprising a pair of parallel, longitudinally extending one piece line receiving channels, with each channel comprising a generally rectangular cross sectional outline and which comprises a base wall portion, a cover portion, and opposite side wall portions which extend between the base wall portion and cover portion, a plurality of longitudinally spaced transverse separations which subdivide the line receiving channel into a plurality of segments, with the transverse separating extending through the cover portion, and continuing into the side wall portions to at least the vicinity of the base wall portion and without severing the bottom wall so that the segments are tiltable relative to one another, and wherein each transverse separation between each adjacent pair of said segments is configured to define at least one recess in one of said adjacent segments and at least one projection in the other of said adjacent segments that engages within the recess, and plurality of longitudinally spaced apart connecting members interconnecting the pair of line receiving channels.

* * * * *

UNITED STATES PATENT AND TRADEMARK OFFICE
CERTIFICATE OF CORRECTION

PATENT NO. : 6,459,037 B2
DATED : October 1, 2002
INVENTOR(S) : Müller et al.

It is certified that error appears in the above-identified patent and that said Letters Patent is hereby corrected as shown below:

Column 10,
Line 36, "separations which" should read -- plurality --.

Column 12,
Line 26, "separating" should read -- separations --.
Line 36, before "plurality" insert -- a --.

Signed and Sealed this

Fourth Day of February, 2003

JAMES E. ROGAN
*Director of the United States Patent and Trademark Office*